United States Patent
Ramakrishna et al.

(10) Patent No.: US 10,733,037 B2
(45) Date of Patent: Aug. 4, 2020

(54) STAB: SMART TRIAGING ASSISTANT BOT FOR INTELLIGENT TROUBLESHOOTING

(71) Applicant: Cisco Technology, Inc., San Jose, CA (US)

(72) Inventors: Rahul Ramakrishna, San Jose, CA (US); Yathiraj B. Udupi, San Jose, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 15/342,340

(22) Filed: Nov. 3, 2016

(65) Prior Publication Data

US 2018/0121808 A1    May 3, 2018

(51) Int. Cl.
| | | |
|---|---|---|
| *G06F 11/07* | (2006.01) | |
| *H04L 12/58* | (2006.01) | |
| *G06N 20/00* | (2019.01) | |

(52) U.S. Cl.
CPC ...... *G06F 11/0709* (2013.01); *G06F 11/0787* (2013.01); *G06F 11/0793* (2013.01); *H04L 51/02* (2013.01); *G06N 20/00* (2019.01)

(58) Field of Classification Search
CPC ............... G06F 11/079; G06F 11/0709; G06F 11/0793; G06Q 10/20; G06Q 10/06; G06Q 10/10; G06N 5/022; G06N 20/00; H04L 51/02
See application file for complete search history.

(56) References Cited

U.S. PATENT DOCUMENTS

| | | | |
|---|---|---|---|
| 7,003,560 B1 * | 2/2006 | Mullen | G06Q 10/06 709/223 |
| 9,036,805 B2 * | 5/2015 | Fan | H04M 3/5166 379/265.09 |
| 9,401,989 B2 | 7/2016 | Uba et al. | |

(Continued)

OTHER PUBLICATIONS

Robert, Joey., "Building a chat bot for fun and profit", https://joeyrobert.org/2016/05/18/buildingachatbotforfunandprofit/, May 18, 2016, 8 pages, joeyrobert.org.

(Continued)

*Primary Examiner* — Eric Nilsson
*Assistant Examiner* — Catherine F Lee
(74) *Attorney, Agent, or Firm* — Behmke Innovation Group LLC; Kenneth J. Heywood; Jonathon P. Western

(57) ABSTRACT

In one embodiment, a server in a network reports one or more symptoms of a monitored device that is malfunctioning to a user interface via a particular chatbot session. The server receives, via the particular chatbot session, a triage request to enter a triage mode regarding the one or more reported symptoms. The server predicts a corrective action using the one or more reported symptoms as input to a machine learning model. The machine learning model is trained using a history of observed symptoms in the network, a history of corrective actions initiated via chatbot sessions and associated with the observed symptoms, and a history of feedback regarding the corrective actions received via the chatbot sessions. The server provides the predicted corrective action to the user interface via the particular chatbot session as a suggested corrective action, in response to the received triage request.

20 Claims, 9 Drawing Sheets

(56) References Cited

U.S. PATENT DOCUMENTS

| | | | | |
|---|---|---|---|---|
| 2008/0109683 A1* | 5/2008 | Erwin | ............... | G06F 11/0709 |
| | | | | 714/46 |
| 2014/0098949 A1 | 4/2014 | Williams | | |
| 2016/0094492 A1 | 3/2016 | Li et al. | | |
| 2016/0350173 A1* | 12/2016 | Ahad | ................. | G06F 11/0751 |
| 2017/0235629 A1* | 8/2017 | Go | ..................... | G06F 11/0751 |
| | | | | 714/57 |

OTHER PUBLICATIONS

Dekoenigsberg, Greg., "Full automation of ansibull-bot for pr triage", https://groups.google.com/forum/#!msg/ansibledevel/FFzYsbzXx7o/XE7s4JcsAwAJ, 1 page, Web Page Accessed on Aug. 3, 2016, groups.google.com.

"Recommender system", https://en.wikipedia.org/wiki/Recommender_system, Jul. 23, 2016, 11 pages, Wikimedia Foundation, Inc.

Leskovec, et al., "Recommendation Systems", Mining of Massive Datasets, http://infolab.stanford.edu/~ullman/mmds/ch9.pdf, 6 pages, Mar. 2014, Stanford University.

"Datadog", https://slack.com/apps/A0F7XDT7F-datadog, Accessed on Aug. 19, 2016, Slack.

Jarkko Laine "Get Started With Monitoring Your Web Application Using New Relic Alerts" Jul. 2, 2015.

\* cited by examiner

US 10,733,037 B2

STAB: SMART TRIAGING ASSISTANT BOT FOR INTELLIGENT TROUBLESHOOTING

TECHNICAL FIELD

The present disclosure relates generally to computer networks, and, more particularly, to a smart triaging assistant bot for intelligent troubleshooting in a computer network.

BACKGROUND

Correcting a malfunctioning device in a network entails a number of related administrative tasks. First, there must be some mechanism to monitor the status of a given device, either automatically or explicitly. For example, a user of the device may submit a support ticket indicating that the device is responding slowly to user commands. Second, there must be a mechanism to diagnose the malfunction from the monitored status. For example, a network administrator may note that the device is responding slowly due to a memory leak in a particular application running on the device. Finally, there must be some mechanism to take corrective measures based on the diagnosed cause. For example, the network administrator may kill the application, to restore available resources on the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
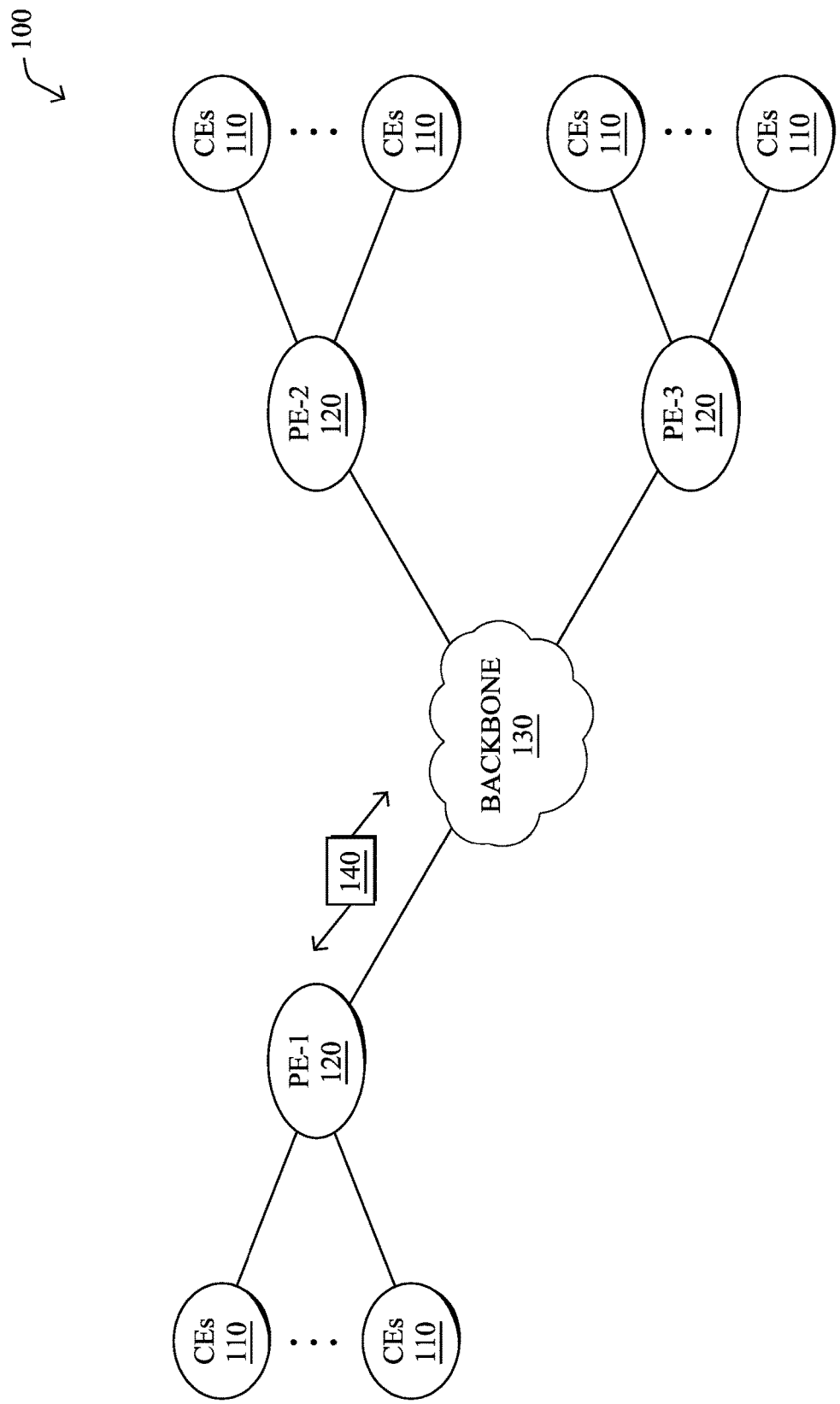
FIGS. 1A-1B illustrate an example communication network.

According to one or more embodiments of the disclosure, a server in a network reports one or more symptoms of a monitored device that is malfunctioning to a user interface via a particular chatbot session. The server receives, via the particular chatbot session, a triage request to enter a triage mode regarding the one or more reported symptoms. The server predicts a corrective action using the one or more reported symptoms as input to a machine learning model. The machine learning model is trained using a history of observed symptoms in the network, a history of corrective actions initiated via chatbot sessions and associated with the observed symptoms, and a history of feedback regarding the corrective actions received via the chatbot sessions. The server provides the predicted corrective action to the user interface via the particular chatbot session as a suggested corrective action, in response to the received triage request.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
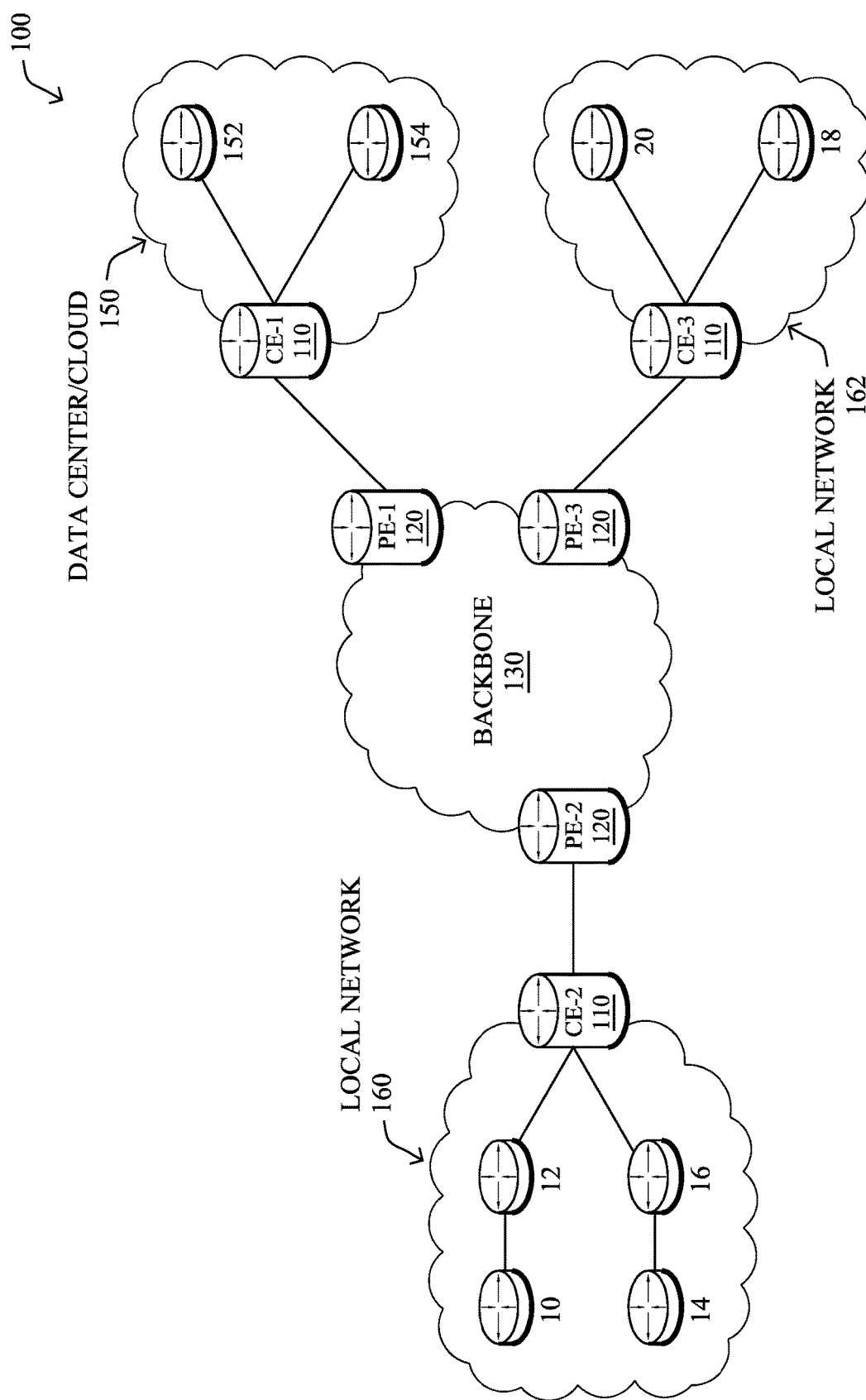

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
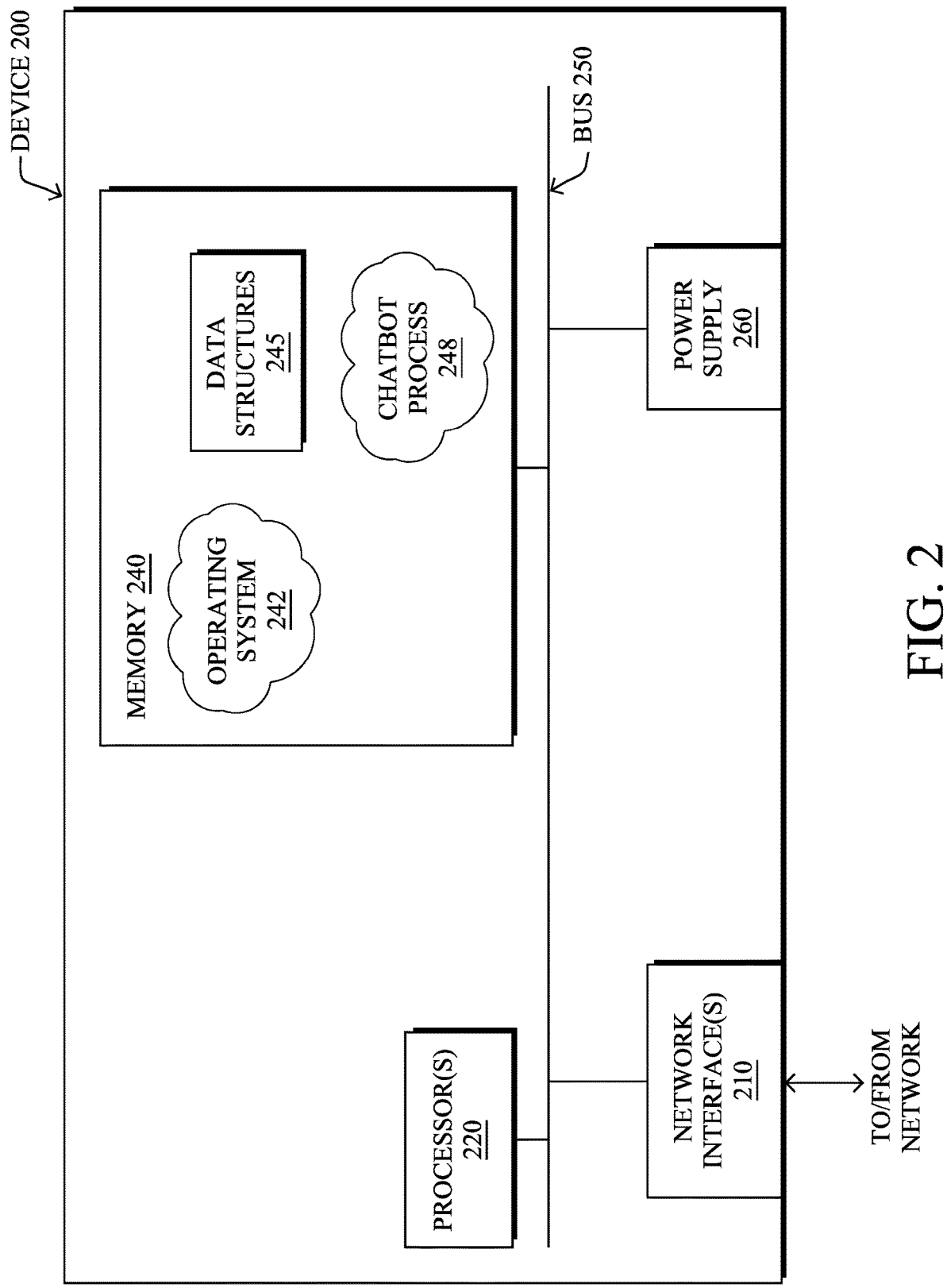
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a chatbot process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Chatbot process 248 includes computer executable instructions that, when executed by processor(s) 220, cause device 200 to operate as part of a monitoring and diagnostic infrastructure within the network. In various embodiments, chatbot process 248 may utilize machine learning techniques, to perform diagnostic and recommendation functions as part of the infrastructure. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

As noted above, monitoring, troubleshooting, and triaging malfunctions in cloud deployments and other networks entails a number of steps that are typically driven by an administrator. Typically, the administrator is a subject matter expert that goes through a sequence of steps to resolve the issue. Post-mortem triage sessions then involve the expert administrator(s) attempting to understand the state of the system (e.g., by analyzing dashboards presenting historical data, analyzing the log lines from the past, running scripts to check system characteristics, etc.).

One way to help ensure the health of the network is to use bots/agents that automate some of the health check and monitoring tasks. For example, an end user device may execute a monitoring agent that tracks the available system resources of the device, device, application, and/or network performance, and other such indicators of the health of the device. Doing so allows an administrator to diagnose malfunctions from a resource, hardware, software/application, and/or network perspective.

Chatbots are a promising technology that generally functions to simulate electronic communications sent by human users. For example, assume that a user is engaged in a chat session, such as an Internet Relay Chat (IRC) session or any other form of chat session. At the other end of the session may be a Chabot application that is configured to respond to communications sent by the user (e.g., the chatbot may respond with an answer to the user's question, etc.). Such a technology holds promise in the field of network monitoring and troubleshooting, as chatbots can be built to send automated alert event notifications from the monitored system to specific chat channels.

STAB: Smart Triaging Assistant Bot for Intelligent Troubleshooting

The techniques herein introduce a chatbot able to monitor devices, applications, cloud platforms, network, or any other form of computing system. In some aspects, the chatbot may generate symptom-driven, intelligent triaging and troubleshooting workflow step recommendations. In further aspects, the chatbot itself may undertake smart, rule-driven triage actions, automatically. In another aspect, the chatbot may export triage session summaries to other systems, such as an external storage system or code versioning system, to enable post-mortem triage sessions.

Specifically, according to one or more embodiments of the disclosure as described in detail below, a server in a network reports one or more symptoms of a monitored device that is malfunctioning to a user interface via a particular chatbot session. The server receives, via the particular chatbot session, a triage request to enter a triage mode regarding the one or more reported symptoms. The server predicts a corrective action using the one or more reported symptoms as input to a machine learning model. The machine learning model is trained using a history of observed symptoms in the network, a history of corrective actions initiated via chatbot sessions and associated with the observed symptoms, and a history of feedback regarding the corrective actions received via the chatbot sessions. The server provides the predicted corrective action to the user interface via the particular chatbot session as a suggested corrective action, in response to the received triage request.

Illustratively, the techniques described herein may be performed by hardware, software, and/or firmware, such as in accordance with chatbot process 248, which may include computer executable instructions executed by the processor 220 (or independent processor of interfaces 210) to perform functions relating to the techniques described herein.

Figure 3:
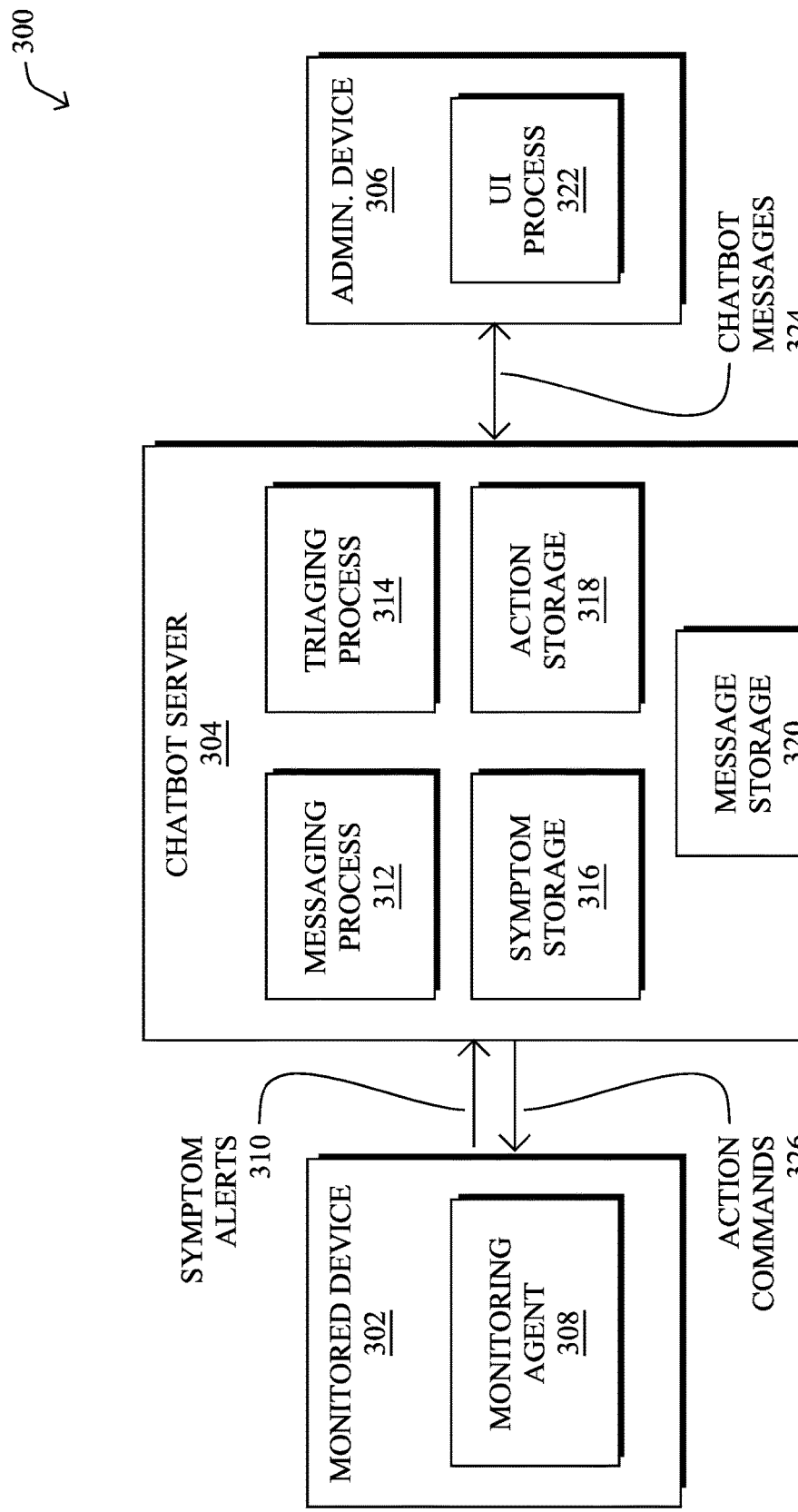
FIG. 3 illustrates an example architecture for a smart triaging chatbot.

Operationally, FIG. 3 illustrates an example architecture for a smart triaging chatbot, according to various embodiments. In general, architecture 300 may comprise any number of monitored devices 302 and at least one chatbot server 304, which may be part of a cloud-based service, in some cases. Further, architecture 300 may include any number of administrator devices 306 in communication with chatbot server(s) 304 and/or monitored device(s) 302. During operation, the devices 302-306 shown in architecture 300 may communicate with one another to monitor device 302, detect symptoms of malfunctions or other problems, and initiate a chatbot session to triage the detected symptoms.

The various devices in architecture 300 may execute various processes (e.g., sub-processes of a distributed chatbot process 248). For example, monitored device 302 may execute a monitoring agent 308 that is configured to monitor the state of device 302 for symptoms of malfunctions (e.g., misconfigurations, misbehaving applications or hardware, network problems, user-reported issues, or the like). Such state information may include, but is not limited to, device resource usage (e.g., CPU usage, memory usage, etc.), application-specific information (e.g., response times, device driver signaling, etc.), network-related information (e.g., upstream or downstream bandwidth, losses, jitter, etc.), or any other information that may be indicative of the health of monitored device 302.

As shown, monitoring agent 308 may send symptom alerts 310 to chatbot server 304. In some embodiments, monitoring agent 308 may use any number of predefined thresholds, to trigger the sending of a symptom alert 310 to chatbot server 304. For example, if the CPU usage of monitored device 302 exceeds a reporting threshold, monitoring agent 308 may generate and send a symptom alert 310 to chatbot server 304. In further embodiments, symptom alerts 310 may include only raw measurements from monitored device 302 and chatbot server 304 may determine whether or not the measurements are symptomatic of a malfunction. In yet another embodiment, symptom alerts 310 may include an explicit set of one or more symptoms entered by the user of monitored device 302 to monitoring agent 308. For example, the user of monitored device 302 may enter a bug report that is then passed to chatbot server 304 as a symptom alert 310.

Monitored device 302 may generally be any type of device in the network. For example, monitored device 302 may be an end-user device, such as a desktop computer, a laptop computer, a tablet device, a mobile phone, a wearable electronic device, or the like. In other cases, monitored device 302 may be a backend server or other networking device in the network, such as a switch, router, firewall, etc.

Chatbot server 304 may execute a messaging process 312 that performs message processing between chatbot server 304, monitored device 302, and administrator device 306. In various embodiments, messaging process 312 may handle any incoming symptom alerts 310 and, in turn, provide symptom alerts 310 to a user interface (UI) process 322 executed by administrator device 306. Notably, messaging process 312 may provide symptom alerts 310 for review by the user of administrator device 306 as part of a chatbot session in which chatbot server 304 and administrator device 306 exchange chatbot messages 324. In some embodiments, messaging process 312 may also publish symptom alerts 310 to any number of selected chat channels to which administrator device 306 may subscribe (e.g., the administrator is a specialist for a particular application and only wishes to see symptom alerts regarding that application, etc.).

As part of the chatbot session with administrator device 306, the user of device 306 may be able to request triage support from triaging process 314 executed by chatbot server 304 (e.g., by sending a message 324 back to server 304 during the chatbot session). In various embodiments, triaging process 314 is configured to intelligently generate triaging and troubleshooting workflow step recommendations to be provided via the chatbot session with administrator device 306. Notably, triaging process 314 may be configured to connect the symptoms reported in the chatbot session to a triage workflow that comprises a set of steps to resolve the issue.

In various embodiments, triaging process 312 may use a machine learning model to predict a corrective action/step that should be taken in view of the symptoms reported in the chatbot session to administrator device 306. Such a model may be trained (e.g., periodically, on demand, continuously, etc.), for example, based on a history of previously reported symptoms in symptom storage 316, a history of actions previously taken to address the previously reported symptoms in action storage 318, and a history of triage session messages in message storage 320. In other words, triaging process 312 may model the associations between reported symptoms, actions taken to address the reported symptoms, and feedback regarding the taken actions (e.g., from message storage 320), to predict a suggested corrective action given an input set of one or more symptoms. In turn, triaging process 312 may send the suggested action or set of actions to administrator device 306 as part of the chatbot session, when the triaging mode is enabled.

Chatbot server 304 may also be configured to provide administrative control over monitoring agent 308 and/or monitored device 302 in general (e.g., using processes 312-314). For example, chatbot server 304 may convert administrative commands entered by the user of administrator device 306 during a chatbot session into action commands 326 sent to monitored device 302 or another device in the network. In turn, the receiving device may implement the action. For example, if the user of administrator device 306 requests a reboot of monitored device 302 via the chatbot session, chatbot server 304 may pass the reboot command to monitored device 302 via action commands 326.

In some embodiments, chatbot server 304 may automatically initiate a corrective action, in response to receiving a symptom alert 310. For example, the user of administrator device 306 may establish one or more rules on chatbot server 304 that cause server 304 to send out a corresponding action command 326 based on the received symptom(s).

As would be appreciated, the devices 302-306 shown in architecture 300 illustrate one potential implementation. In further implementations, the functions described with respect to these devices may be distributed among one another or to other devices, as desired. For example, while administrator device 306 is shown as executing UI process 322 that communicates with chatbot server 304, chatbot server 304 may instead execute UI process 322, itself, in other embodiments. In another example, monitored device 302 may instead execute some or all of the functions of chatbot server 304, thereby operating as a chatbot server, itself.

Figure 4A:
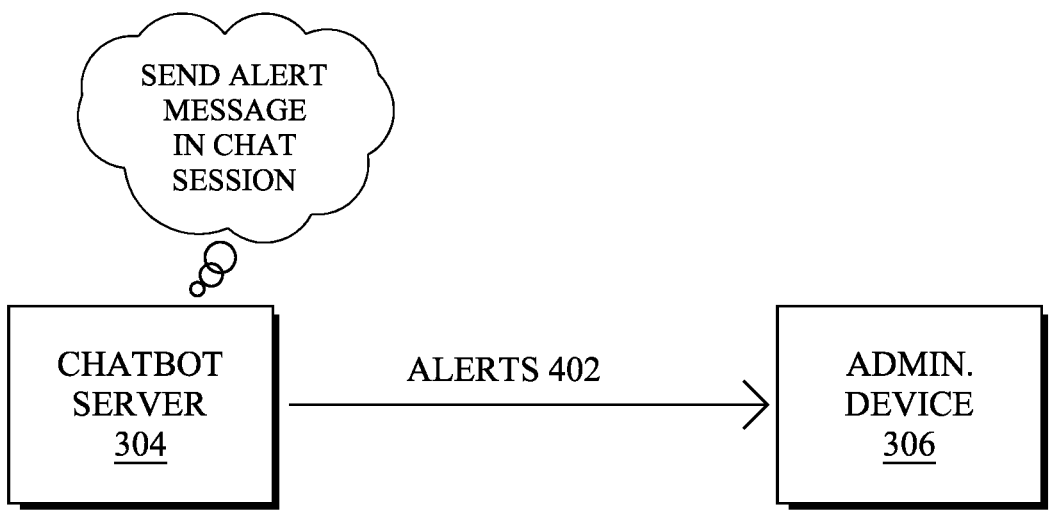
FIGS. 4A-4F illustrate examples of a triaging chatbot session.

FIGS. 4A-4F illustrate examples of a triaging chatbot session using architecture 300, according to various embodiments. As shown in FIG. 4A, chatbot server 304 may initially operate in a mode referred to herein as a symptom(s) collection phase. In this phase, chatbot server 304 may receive and process incoming chat message notifications or alerts sent by external agents integrated into the chatbot platform (e.g., agent 308 of monitored device 302, etc.). These messages will have key characteristics that identify the situation, the impacted entity (e.g., host device, application service, etc.), the state of the entity, the severity of the situation, and any additional metadata.

In turn, as shown, chatbot server 304 may send any number of alerts 402 to administrator device 306 via a chatbot session, to report any of the symptoms collected by chatbot server 304. Generally, alert 402 may include any information regarding the reported symptoms from the monitored device (e.g., device 302). For example, alerts 402 may be of the form:

webhookbot BOT [12:40 PM]
Resource consumption(memory,cpu,disk) is high for the host fluentd13.zeus.io. Memory: 75.61% Cpu: 20.6% Disk: 3%
webhookbot BOT [1:19 PM]
Host:fluentd13.zeus.io is not accessible via ssh.

The above messages will help in capturing information such as the identity of the affected device/entity (e.g., host fluentd13.zeus.io), the state of the entity (e.g., resource consumption is high), the severity (e.g., high), and any metadata indicative of the symptoms as key-value pairs (e.g., Memory: 75.61%, Cpu: 20.6%, Disk: 3%). Similarly, the second alert may indicate that SSH is not accessible at the same entity/device and is a critical issue. Alerts 402 may further include timestamps, allowing chatbot server 304 to record when the symptoms were reported and indicate this information to the user of administrator device 306.

Figure 4B:
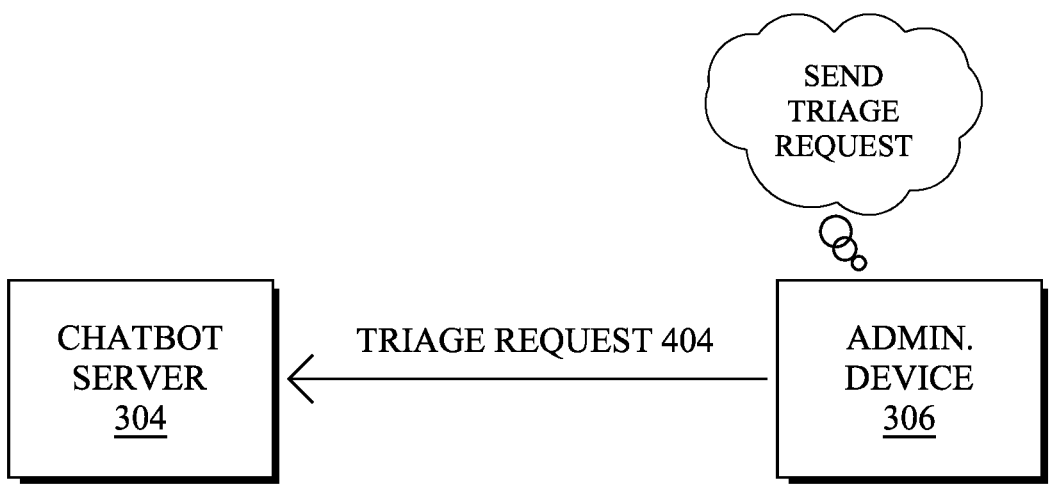

As shown in FIG. 4B, the user of administrator device 306 may request entry of a triage mode by sending a triage request 404 to chatbot server 304 via the chatbot session. While in the triage mode, chatbot server 304 may begin recording the corrective actions initiated with respect to the reported symptoms and may offer suggested actions, if any. For example, triage request 404 may be a chat message of the form:

User: "Triage session START"

In response, chatbot server 304 may confirm entry into the triage mode by replying in the chatbot session:

STAB: "Starting Triage session recording and recommendations"

Figure 4C:
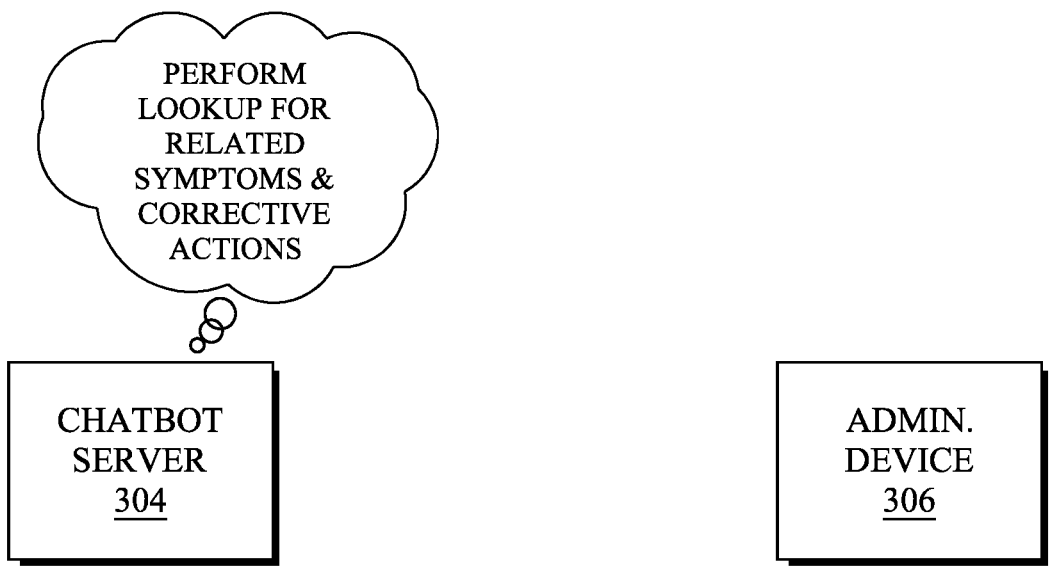

As shown in FIG. 4C, chatbot server 304 may also perform a lookup for related symptoms that were previously addressed by the system and the corrective actions taken.

For example, in some embodiments, chatbot server 304 may use the current symptom(s) under review as input to its machine learning model that tracks previously reported symptoms, triage actions taken, and their effectiveness to resolve the symptoms. In some cases, chatbot server 304 may do so in response to receiving request 404 to enter the triage mode. In other embodiments, chatbot server 304 may do so beforehand (e.g., in response to first receiving the symptoms from the monitored device).

Figure 4D:
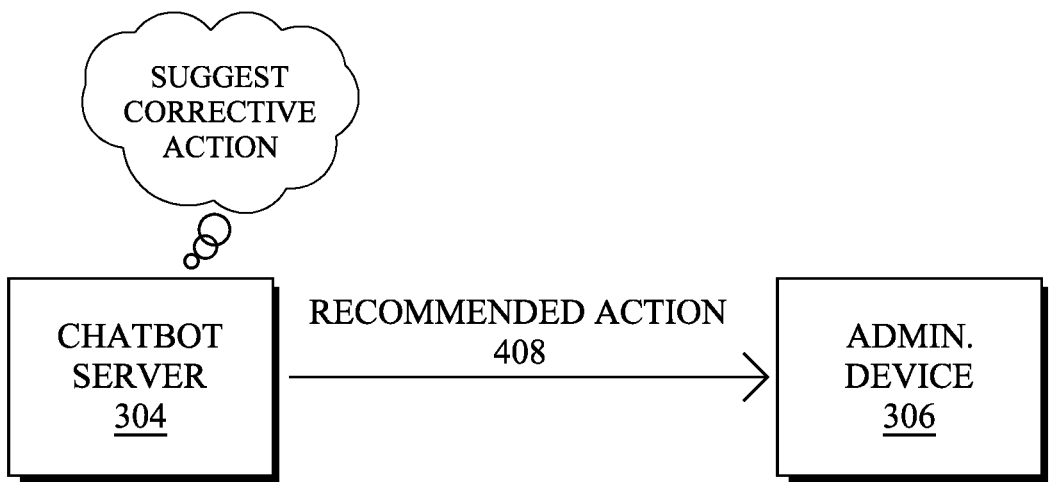

As shown in FIG. 4D, based on the analysis of the reported symptoms, chatbot 404 may send the predicted action to administrator device 306 as a recommended action 408 via the chatbot session and/or provide advice to administrator device 306.

For example—Based on the Memory metadata capture in the reported symptoms, chatbot server 304 can intelligently offer advice in the chatbot session:

STAB—"Host Fluentd13 impacted due to High Memory—75.61%"

Now, if the user of administrator device 304 wishes to triage further, he or she can pose some interactive chats that will be recorded and saved by chatbot server 304:

User: Host fluentd13.zeus.io PING check

This may be a known recorded action in action storage 318 maintained by chatbot server 304 that chatbot server 304 can execute. In turn, chatbot server 304 may report the results of the action via the chatbot session:

BOT [2:21 PM]
Host:fluentd13.zeus.io is not reachable.

This is also recorded by chatbot server 304 as a triage step taken to address the current symptoms under analysis.

Figure 4E:
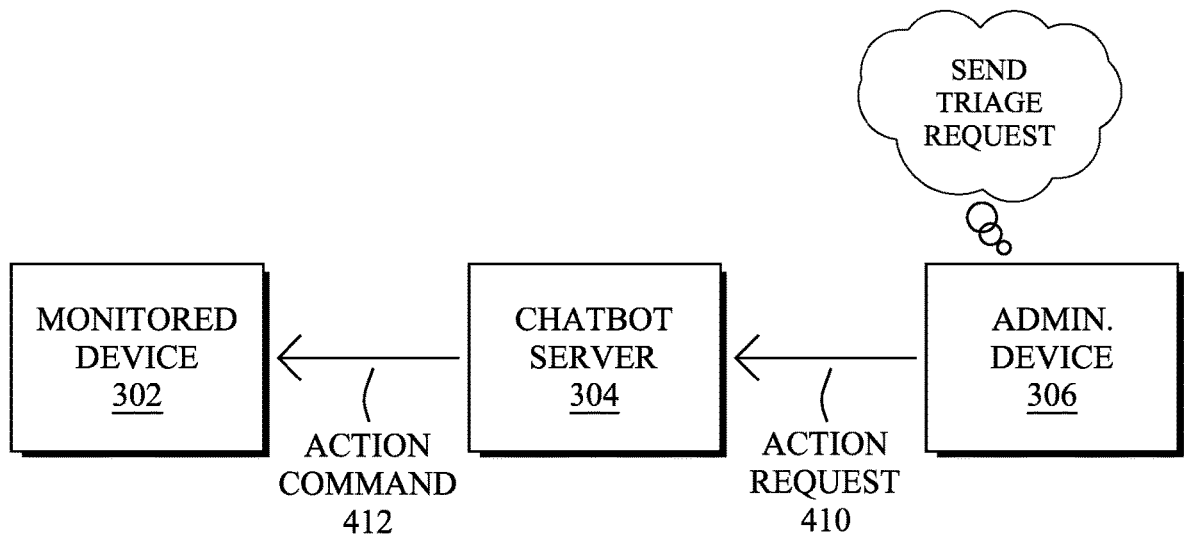

As shown in FIG. 4E, the user of administrator device 306 may also request performance of recommended action 408. For example, assume that chatbot server 304 suggests rebooting the malfunctioning host device. In turn, the user of administrator device 306 may issue an action request 410 as follows:

User: Host fluentd13.zeus.io RESTART

In turn, chatbot server 304 may issue action command 412 to monitored device 302, to cause monitored device 302 to restart.

Figure 4F:
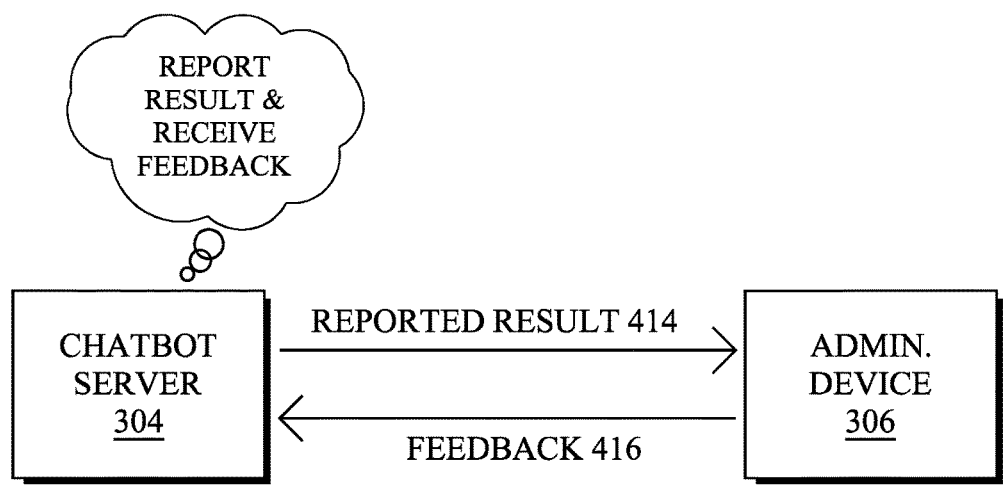

As shown in FIG. 4F, chatbot server 304 may report the results 414 of any corrective actions taken via the chatbot session with administrator device 306. For example, results 414 may be messaged as follows:

BOT [2:30 PM]
Host:fluentd13.ciscozeus.io: Memory: 9.28% Cpu: 74% Disk: 3% is back alive!

In various embodiments, the user of administrator device 306 may provide feedback 416 to chatbot server304 regarding the taken action. For example, if the user believes that the issue has been resolved by the action, the user may simply provide a summary of the triage session and end the session as follows:

User: Triage session Summary—Host fluentd13.ciscozeus.io—HIGH Memory, SSH not accessible, PING not reachable, Host RESTART
User: Triage session END However, if the actions did not satisfactorily address the issue, the user of administrator device 306 may request performance of additional actions, as needed (e.g., via feedback 416). In turn, chatbot server 304 may use the contents of the triage session for the reported symptoms to train or retrain the machine learning model, as needed. For example, chatbot server 304 may update the model based on the assessed symptom(s) reported to the user, the steps/actions taken during the triage session for the symptom(s), and potentially any feedback from the user regarding the steps/actions (e.g., indicating whether a given action addressed the underlying issue).

In other words, chatbot server 304 may record the workflows of the triage sessions to offer guidance in future sessions regarding which steps to take or triage queries to make, in order to get better insight to a set of observed symptoms. As a triage workflow session is associated to a set of symptoms, chatbot server 304 can then make these smart triage workflow recommendations for any similar symptom seen in other hosts.

For example, chatbot server 304 may store the following for each triage session (e.g., in stores 316-320):
1. Case Problem(s)/Symptom(s)—The problem identified.
2. Raw Triage Data—The chat messages that were recorded during the actual triaging session between the chatbot and the user (Queries)
3. Resolution Action Workflow—The sequence of steps (Actions) applied to resolve the issue.

In turn, based on the above data, chatbot 304 may fingerprint case problems for the observed symptoms. In addition, chatbot 304 may create a feature vector for triage sessions. For example, assume that Q represents a given chat session query during a triage and A represent the action taken. In such a case, a feature vector may be of the form: $V_1 = [Q_1, Q_2, Q_3, \ldots, Q_n, A_1, A_2, A_3, \ldots, A_m]$ with Label [0,1], where "n" is the query number to chatbot server 304 and "m" is the total no of actions executed in a given triage session.

Chatbot server 304 may first look for case problems which have been previously resolved and suggest similar case problems which have been resolved before to the current user. For every matched case problem, there might be already saved feature vectors from the past triage sessions. Using this set of feature vectors, chatbot server 304 can recommends new triage queries and actions as a new feature vector based on applying collaborative filtering, content-based filtering, or the like. In other words, chatbot server 304 may operate as a recommender system, in some embodiments. Another potential modification would be to also combine case problems as a set of features to add to the feature vector, so the recommendation can be completed with the known set of case problems of the current issue to be triaged.

Figure 5A:
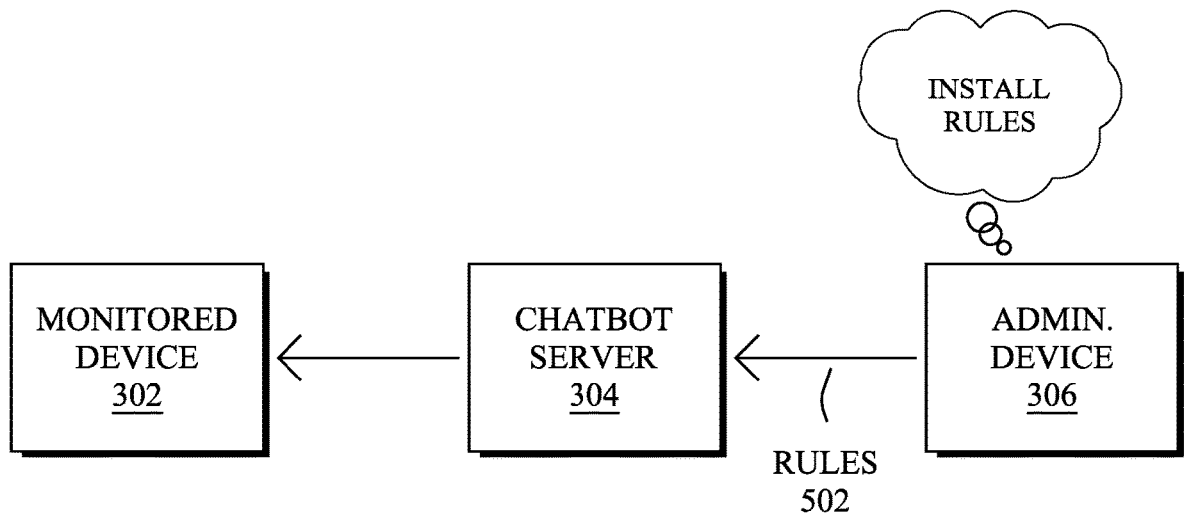
FIGS. 5A-5B illustrate examples of a triaging rule.
Figure 5B:
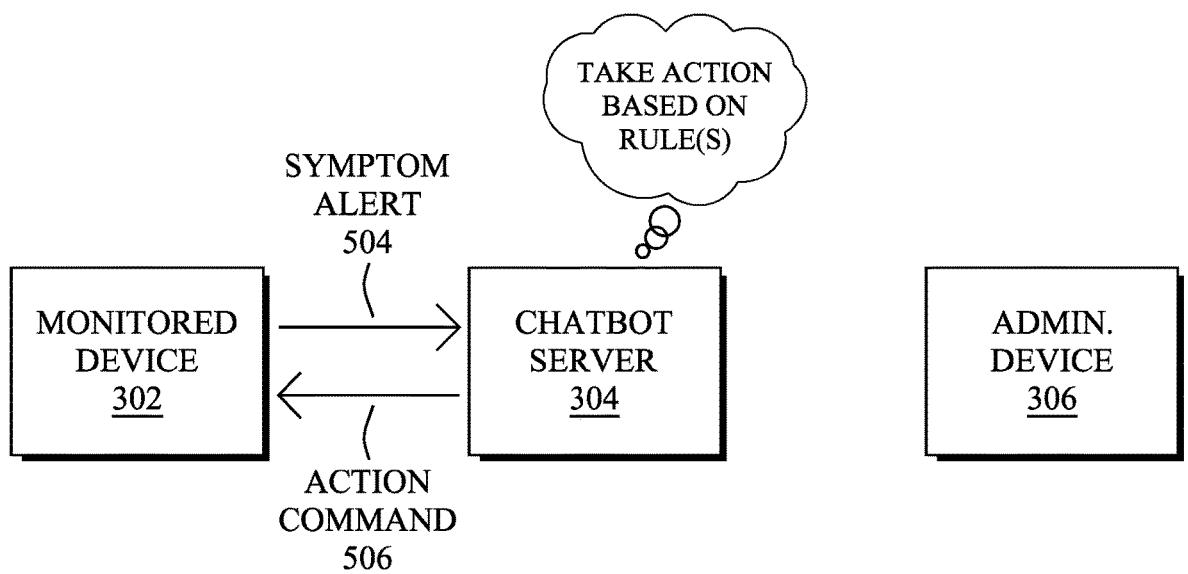

FIGS. 5A-5B illustrate examples of a triaging rule, according to various embodiments. In addition to making triage workflow step recommendations, certain actions can be automatically handled by chatbot server 304, as long as specific rules have been added by the admin expert user managing the monitored system. For example, as shown in FIG. 5A, the user of administrator device 306 may send one or more rules 502 to chatbot server 304 via the chat session. Generally, a rule 502 may associate one or more symptoms/conditions with one or more actions. For example, rule 502 may be of the form:

"When host memory is higher than 80%—RESTART the host"

Such a rule may enable chatbot server 304 to implement the action whenever the rule condition is met, without requiring approval first from the administrative user.

As shown in FIG. 5B, assume that chatbot server 304 later receives a symptom alert 504 that matches the symptom(s)/condition(s) of rule 502. In such a case, chatbot server 304 may automatically send an action command 506 to monitored device 302. For example, chatbot server 304 may instruct device 302 to restart, in response to symptom alert 504 indicating that memory usage by device 302 is greater than 80%. Similarly, rules can be enabled for some triage workflow actions, and recommendations to assist the admin user. Chatbot server 304 may also record any automatically taken actions, similar to those requested by a user in a triage workflow session.

Figure 6:
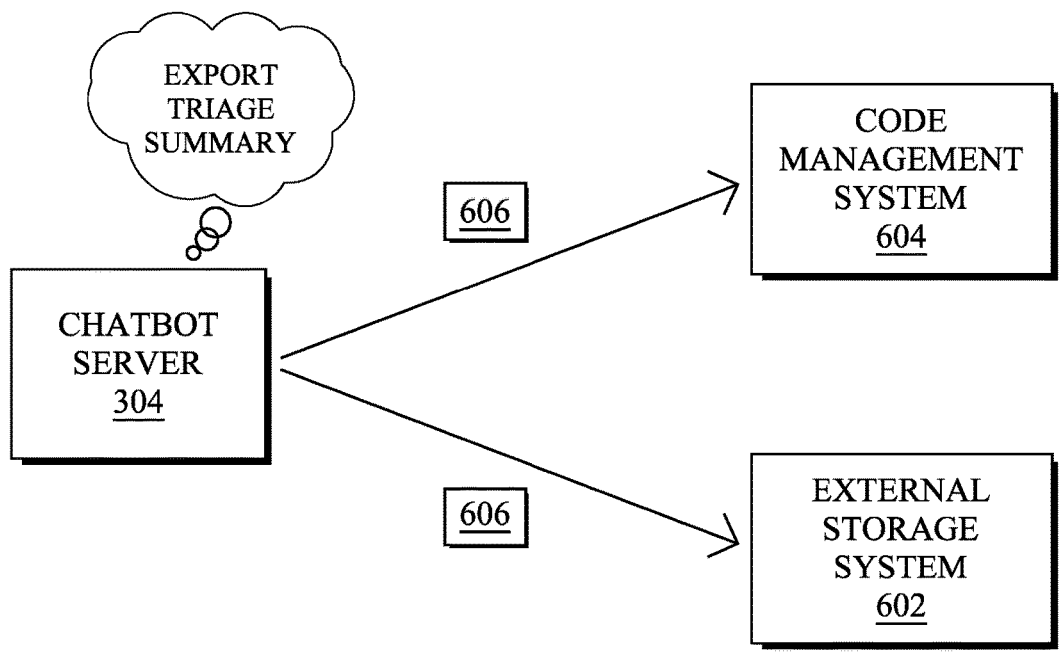
FIG. 6 illustrates examples of the sharing of triaging session data.

FIG. 6 illustrates examples of the sharing of triaging session data, according to various embodiments. Using the above techniques, chatbot server 304 may record summaries of the triage chatbot session. A potentially useful step would also be for chatbot server 304 to export the triage chat summary to be seen by different team members or for a subsequent post mortem session.

For example, as shown, chatbot server 304 may export triage summary data 606 to either or both of the following:
  a) an external data storage system 602 as file based reports saving the chat snippets; and/or
  b) a code version management system 604. Here, a certain triage workflow session can also be tagged to a commit identifier in the code, enabling the coding team to figure which commit broke the system and for rollbacks.

Figure 7:
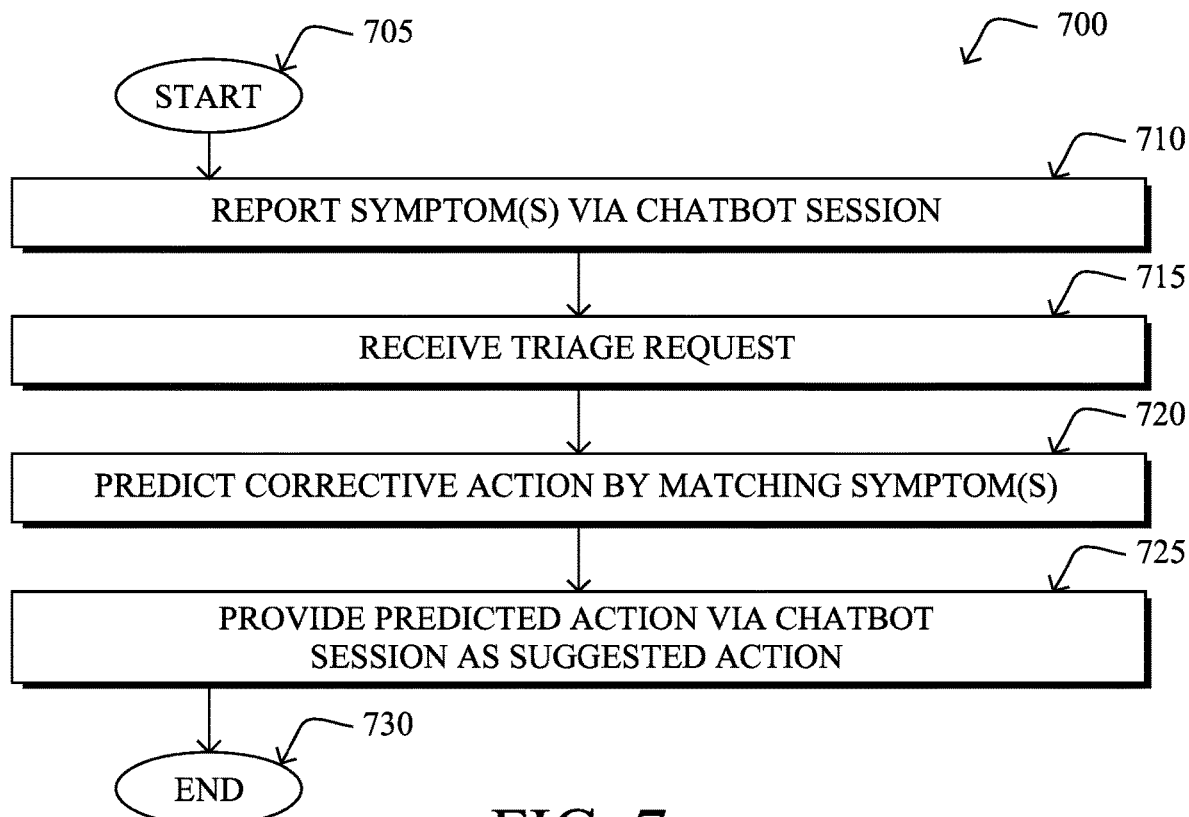
FIG. 7 illustrates an example simplified procedure for suggesting a corrective action via a chatbot session.

FIG. 7 illustrates an example simplified procedure for suggesting a corrective action via a chatbot session in accordance with one or more embodiments described herein. For example, a non-generic, specifically configured device (e.g., a chatbot server) may perform procedure 700 by executing stored instructions. The procedure 700 may start at step 705, and continues to step 710, where, as described in greater detail above, the chatbot server may report one or more symptoms of a monitored device that is malfunctioning to a user interface via a chatbot session. The monitored device may be, for example, a network device (e.g., a router, switch, etc.), end-user device, cloud-based device, or other backend device. In addition, the monitored device may execute a local agent that monitors and reports the status of the device to the chatbot server, thereby allowing the chatbot server to obtain symptoms of a malfunction.

At step 715, as detailed above, the server may receive a triage request to enter a triage mode from the user interface. For example, the corresponding user of the interface may send a chat message to the server requesting triaging of the symptom(s) reported in step 710.

At step 720, the server may predict a corrective action using the one or more reported symptoms as input to a machine learning model, as described in greater detail above. In some embodiments, the machine learning model is trained using a history of observed symptoms in the network, a history of corrective actions initiated via chatbot sessions and associated with the observed symptoms, and a history of feedback regarding the corrective actions received via the chatbot sessions.

At step 725, as detailed above, the server may provide the predicted corrective action to the user interface. For example, the server may send the predicted action via the chatbot session with the user interface as a suggested corrective action, in response to the received triage request. In various embodiments, the user may then request performance of the action and the server may cause performance of the requested action. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a smart chatbot that can be used to monitor and redress problems in a network. First, the techniques herein enable smart triage workflow action/step recommendations, to assist a user in the middle of a triage session. Second, the system is able to capture an analyze symptoms of a system issue based on messages received as alerts or notifications from the monitored systems. Third, the system can record the steps/actions performed in a given triage session and summarize the session. Fourth, the system enables a library of actions to be driven as chat messages. Fifth, the system enables the use of smart rules, which can be used to trigger actions automatically. Sixth, the techniques herein can provide step/action recommendations based on previously recorded triage workflow sessions.

While there have been shown and described illustrative embodiments that provide for a smart chatbot, it is to be understood that various other adaptations and modifications may be made within the spirit and scope of the embodiments herein. For example, while certain embodiments are described herein with respect to using certain models for purposes of machine learning, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
reporting, by a server in a network, one or more symptoms of a monitored device that is malfunctioning to a user interface via a particular chatbot session using a natural language processing;
receiving, at the server and via the particular chatbot session, a triage request to enter a triage mode regarding the one or more reported symptoms;
predicting, by the server, a corrective action using the one or more reported symptoms as input to a machine learning model, wherein the machine learning model is trained using a history of observed symptoms in the network, a history of corrective actions initiated via chatbot sessions and associated with the observed symptoms, and a history of feedback regarding the corrective actions received via the chatbot sessions;
generating, by the server, a plurality of feature vectors, wherein each feature vector comprises one or more of the observed symptoms, corrective actions initiated via the chatbot sessions, and feedback regarding the corrective actions received via the chatbot sessions;
providing, by the server, the predicted corrective action to the user interface via the particular chatbot session as a suggested corrective action, in response to the received triage request; and
providing, by the server, a triage mechanism summary to an external storage system or code version management system.

2. The method as in claim 1, further comprising:
receiving, at the server, a request to implement the suggested corrective action via the chatbot session; and
causing, by the server, performance of the suggested corrective action in response to receiving the request to implement the suggested corrective action.

3. The method as in claim 2, further comprising:
providing, by the server, an indication of a result of the performed corrective action via the particular chatbot session; and
receiving, at the server, feedback from the user interface regarding the result of the performed corrective action via the particular chatbot session.

4. The method as in claim 1, wherein the feedback comprises a request to exit the triage mode regarding the one or more reported symptoms.

5. The method as in claim 1, further comprising:
receiving, at the server, an indication of the one or more symptoms for an agent executed by the monitored device.

6. The method as in claim 1, wherein the monitored device comprises one of: a router or switch.

7. The method as in claim 1, further comprising:
receiving, at the server, a rule from the user interface via the particular chatbot session, wherein the rule associates a set of one or more symptoms to an automatic corrective action to be initiated by the server.

8. The method as in claim 7, further comprising:
initiating, by the server, the automatic corrective action in response to receiving an indication from the monitored device that the monitored device is exhibiting the one or more symptoms of the rule.

9. The method as in claim 1, further comprising:
providing, by the server, a triage mechanism summary to an external storage system or code version management system.

10. An apparatus, comprising:
one or more network interfaces to communicate with a computer network;
a processor coupled to the one or more network interfaces and configured to execute a process; and
a memory configured to store the process executable by the processor, the process when executed configured to:
report one or more symptoms of a monitored device that is malfunctioning to a user interface via a particular chatbot session using a natural language processing;
receive, via the particular chatbot session, a triage request to enter a triage mode regarding the one or more reported symptoms;
predict a corrective action using the one or more reported symptoms as input to a machine learning model, wherein the machine learning model is trained using a history of observed symptoms in the network, a history of corrective actions initiated during chatbot sessions and associated with the observed symptoms, and a history of feedback regarding the corrective actions received during the chatbot sessions;
generate a plurality of feature vectors, wherein each feature vector comprises one or more of the observed symptoms, corrective actions initiated via the chatbot sessions, and feedback regarding the corrective actions received via the chatbot sessions;
provide the predicted corrective action to the user interface via the particular chatbot session as a suggested corrective action, in response to the received triage request; and
provide a triage mechanism summary to an external storage system or code version management system.

11. The apparatus as in claim 10, wherein the process when executed is further operable to:
receive a request to implement the suggested corrective action via the chatbot session;
cause performance of the suggested corrective action in response to receiving the request to implement the suggested corrective action;
provide an indication of a result of the performed corrective action via the particular chatbot session; and
receive feedback from the user interface regarding the result of the performed corrective action via the particular chatbot session.

12. The apparatus as in claim 10, wherein the feedback comprises a request to exit the triage mode regarding the one or more reported symptoms.

13. The apparatus as in claim 10, wherein the process when executed is further operable to:
receive an indication of the one or more symptoms for an agent executed by the monitored device.

14. The apparatus as in claim 10, wherein the process when executed is further operable to:
receive a rule from the user interface via the particular chatbot session, wherein the rule associates a set of one or more symptoms to an automatic corrective action to be initiated by the apparatus.

15. The apparatus as in claim 14, wherein the process when executed is further operable to:
initiate the automatic corrective action in response to receiving an indication from the monitored device that the monitored device is exhibiting the one or more symptoms of the rule.

16. A tangible, non-transitory, computer-readable medium storing program instructions that cause a computer in a network to execute a process comprising:

reporting one or more symptoms of a monitored device that is malfunctioning to a user interface via a particular chatbot session using a natural language processing;
receiving, via the particular chatbot session, a triage request to enter a triage mode regarding the one or more reported symptoms;
predicting a corrective action using the one or more reported symptoms as input to a machine learning model, wherein the machine learning model is trained using a history of observed symptoms in the network, a history of corrective actions initiated during chatbot sessions and associated with the observed symptoms, and a history of feedback regarding the corrective actions received during the chatbot sessions;
generating a plurality of feature vectors, wherein each feature vector comprises one or more of the observed symptoms, corrective actions initiated via the chatbot sessions, and feedback regarding the corrective actions received via the chatbot sessions;
providing the predicted corrective action to the user interface via the particular chatbot session as a suggested corrective action, in response to the received triage request; and
providing a triage mechanism summary to an external storage system or code version management system.

17. The tangible, non-transitory, computer-readable medium as in claim 16, the process further comprising:
receiving, at the server, a request to implement the suggested corrective action via the chatbot session; and
causing, by the server, performance of the suggested corrective action in response to receiving the request to implement the suggested corrective action.

18. The tangible, non-transitory, computer-readable medium as in claim 17, the process further comprising:
providing, by the server, an indication of a result of the performed corrective action via the particular chatbot session; and
receiving, at the server, feedback from the user interface regarding the result of the performed corrective action via the particular chatbot session.

19. The tangible, non-transitory, computer-readable medium as in claim 16, wherein the feedback comprises a request to exit the triage mode regarding the one or more reported symptoms.

20. The tangible, non-transitory, computer-readable medium as in claim 16, wherein the monitored device comprises one of: a router or switch.

* * * * *